(12) United States Patent
Matsumoto et al.

(10) Patent No.: US 8,976,004 B2
(45) Date of Patent: Mar. 10, 2015

(54) IN-VEHICLE APPARATUS CONTROL SYSTEM

(75) Inventors: Munenori Matsumoto, Kariya (JP); Akira Takaoka, Okazaki (JP); Tohru Yamaguchi, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 570 days.

(21) Appl. No.: 13/439,134

(22) Filed: Apr. 4, 2012

(65) Prior Publication Data

US 2012/0293302 A1    Nov. 22, 2012

(30) Foreign Application Priority Data

Apr. 5, 2011  (JP) .................................. 2011-083755
Feb. 16, 2012 (JP) .................................. 2012-031791

(51) Int. Cl.
  *B60R 16/00*   (2006.01)
(52) U.S. Cl.
  CPC ....................................... *B60R 16/00* (2013.01)
  USPC ........................................................ 340/5.61
(58) Field of Classification Search
  CPC ........................................................ B60R 16/00
  USPC ........................................................ 340/5.61
  See application file for complete search history.

(56) References Cited

U.S. PATENT DOCUMENTS 5,870,380 A      2/1999 Diehl et al.
2012/0179306 A1* 7/2012 Saiki et al. .................... 701/2

FOREIGN PATENT DOCUMENTS

| JP | 2003-106019 | 4/2003 |
| JP | 2004-084406 | 3/2004 |
| JP | 2011-208464 | 10/2011 |

* cited by examiner

*Primary Examiner* — Andrew Bee
(74) *Attorney, Agent, or Firm* — Harness, Dickey & Pierce, PLC

(57) ABSTRACT

An onboard apparatus control system is disclosed. The onboard apparatus control system includes a portable apparatus and an in-vehicle apparatus which controls an onboard apparatus according to position of the portable apparatus. From multiple transmitting antennae, the in-vehicle apparatus transmits pulse pattern signals with different transmission frequencies at an overlapping timing, so that the pulse pattern signals are radio waves whose intensities are changed stepwise according to different patterns. The portable apparatus receives the radio waves transmitted from the multiple transmitting antennae. The position of the portable apparatus with respect to the vehicle is determined based on a combined pattern of the received pulse pattern signals, which a receiving unit is to receive at location with respect to the vehicle.

7 Claims, 15 Drawing Sheets

| TX ANT | D-SEAT (ANT A) | INSIDE TRUNK (ANT C) | P-SEAT (ANT B) |
|---|---|---|---|
| TX FREQ | 124 kHz | 134 kHz | 144 kHz |
| | A<C<B | | |

ENVELOPE PATTERNS STORED IN MEMORY

ANT-A SIDE (D-SEAT SIDE), INSIDE COMPARTMENT

ANT-B SIDE (P-SEAT SIDE), INSIDE COMPARTMENT

ANT-B SIDE (P-SEAT SIDE), OUTSIDE COMPARTMENT

FIG. 19A THREE-STAGE VARIABLE
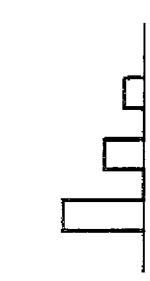
FIG. 19B FIVE-STAGE VARIABLE
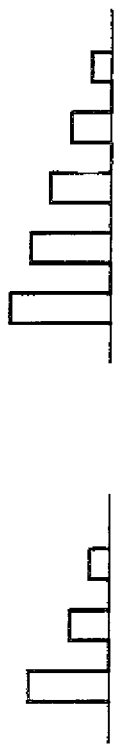
FIG. 19C SEVEN-STAGE VARIABLE

IN-VEHICLE APPARATUS CONTROL SYSTEM

CROSS-REFERENCE TO RELATED APPLICATIONS

The present application is based on and claims priority to Japanese Patent Application No. 2011-83755 filed on Apr. 5, 2011 and Japanese Patent Application No. 2012-31791 filed on Feb. 16, 2012, disclosures of which are incorporated herein by reference.

BACKGROUND

The present disclosure relates to an onboard apparatus control system including a portable apparatus carried by a user and an in-vehicle apparatus mounted in a vehicle to control an onboard apparatus according to the position of the portable apparatus.

A known apparatus transmits a verification radio wave from each of multiple transmitting antennae installed in several places of a vehicle. By receiving a response radio wave which a portable apparatus carried by a user transmits upon receipt of the verification radio wave, the apparatus performs verification and position determination of the portable apparatus, thereby performing locking control, unlocking control etc. of a door of the vehicle according to the position of the portable apparatus (for example, refer to JP-2004-84406A).

The apparatus disclosed in JP-2004-84406A transmits a request signal from multiple transmitting antennae installed in a center pillar of a vehicle on a driver seat side, in a center pillar on a front passenger seat side and in a trunk room etc. A portable apparatus transmits a response signal in response to the request signal. Accordingly, the apparatus determines the position of the portable apparatus based on the response signal. In this way, by transmitting the request signal from the multiple transmitting antennae, the apparatus can determine the position of the portable apparatus with a certain degree of accuracy. However, concurrently transmitting the radio waves from the multiple transmitting antennae may lead to interference, making it difficult for the portable apparatus to receive respective radio waves. For this reason, it is necessary to sequentially transmit the radio waves from the antenna by shifting transmission time, and as a result, it takes a long time to determine the position of the portable apparatus.

SUMMARY

The present disclosure is made in view of the foregoing. It is an object of the present disclosure to provide an onboard apparatus control system that can improve accuracy in determining position of a portable apparatus while reducing a time taken to determine the position of the portable apparatus.

According to an example of the present disclosure, an onboard apparatus control system comprising a portable apparatus portable by a use and an in-vehicle apparatus mounted in a vehicle to control an onboard apparatus according to position of the portable apparatus is provided. The in-vehicle apparatus includes multiple transmitting antennae arranged at mutually-different positions in the vehicle and configured to have mutually-different transmission frequencies and a pulse-pattern-signal transmitting unit configured to transmit pulse pattern signals from the multiple transmitting antennae at an overlapping timing, respectively, so that the pulse pattern signals are radio waves whose intensities are changed stepwise according to mutually-different patterns, respectively. The portable apparatus includes a receiving unit configured to receive the radio waves transmitted from the multiple transmitting antennae. The onboard apparatus control system further comprises a portable apparatus position determining unit configured to determine the position of the portable apparatus with respect to the vehicle based on a combined pattern of the received pulse pattern signals. The combined pattern of the pulse pattern signals received by the receiving unit is in accordance with location of the receiving unit with respect to the vehicle.

BRIEF DESCRIPTION OF THE DRAWINGS

The above and other purposes, the feature, and the advantage of the present disclosure will become fully understood from the detailed description given hereinafter with reference to the accompanying drawings, wherein:

FIG. 19A, FIG. 19B, and FIG. 19C are explanatory diagrams illustrating modified examples.

DETAILED DESCRIPTION

First Embodiment

Figure 1:
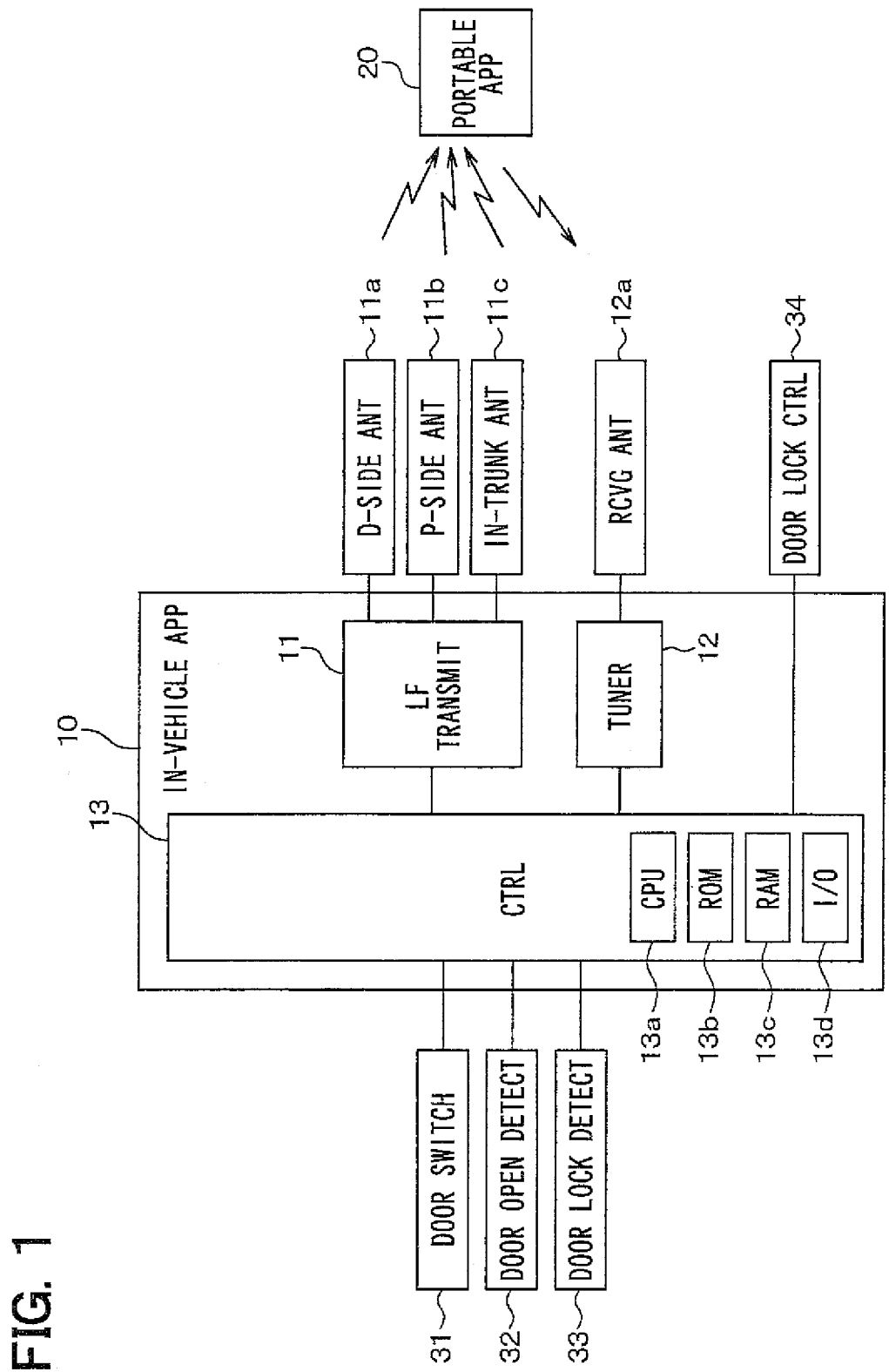
FIG. 1 is a block diagram illustrating a configuration of an onboard apparatus control system of a first embodiment.

FIG. 1 is a block diagram illustrating a configuration of an onboard apparatus control system of a first embodiment. The onboard apparatus control system of the present embodiment includes a portable apparatus 2 carried by a user, and an in-vehicle apparatus 10 mounted in a vehicle to control an onboard apparatus 34 according to position of the portable apparatus 20. The onboard apparatus control system is configured as a keyless entry system.

The in-vehicle apparatus 10 transmits a verification radio wave (request signal) to the portable apparatus 20 carried by a user, and receives a response radio wave (response signal) which the portable apparatus 20 transmits upon receiving the verification radio wave. The in-vehicle apparatus 10 thereby verifies the portable apparatus 20 and determines the position of the portable apparatus 20. According to the position of the portable apparatus 20, the in-vehicle apparatus 10 performs the locking control and unlocking control of a door of the vehicle.

The in-vehicle apparatus 10 includes a low frequency (LF) transmitting unit 11, a tuner 12, and a controller 13.

The LF transmitting unit 11 generates a signal of an LF band according to a signal inputted from the controller 13 and causes each of antennae 11a to 11c to transmit a radio wave corresponding to the generated signal.

The tuner 12 performs amplification, demodulation etc. to a signal received by a receiving antenna 12a.

The controller 13 includes a computer provided with a central processing unit (CPU) 13a, a read-only memory (ROM) 13b, a random access memory (RAM) 13c, an input/output (I/O) 13d, and others. The CPU 13a performs various processes according to a program stored in the ROM 13b.

A door switch 31 includes a touch switch near a doorknob for opening and closing a door of a vehicle, and a touch switch near a doorknob of a trunk door of the vehicle. A signal corresponding to user operation to the door switch 31 is outputted to the controller 13.

A door open/close detector 32 includes a switch for detecting the open/close state of a door of the vehicle, and a switch for detecting the open/close state of a trunk door of the vehicle. A signal indicating the open/close state of the door of the vehicle and the open/close state of the trunk door of the vehicle is outputted from the door open/close detector 32 to the controller 13.

A door lock detector 33 includes a switch for detecting a locked state of the door of the vehicle and a switch for detecting a locked state of the trunk door of the vehicle. A signal indicating the locked state of the door of the vehicle and the locked state of the trunk door of the vehicle is outputted from the door lock detector 33 to the controller 13.

The door lock/unlock controller 34 is provided with an actuator for locking and unlocking the door of the vehicle and an actuator for locking and unlocking the trunk door of the vehicle. The door lock/unlock controller 34 performs the locking control and unlocking control of the door of the vehicle and the locking control and unlocking control of the trunk door of the vehicle, by driving the actuators.

Figures 2, 3:
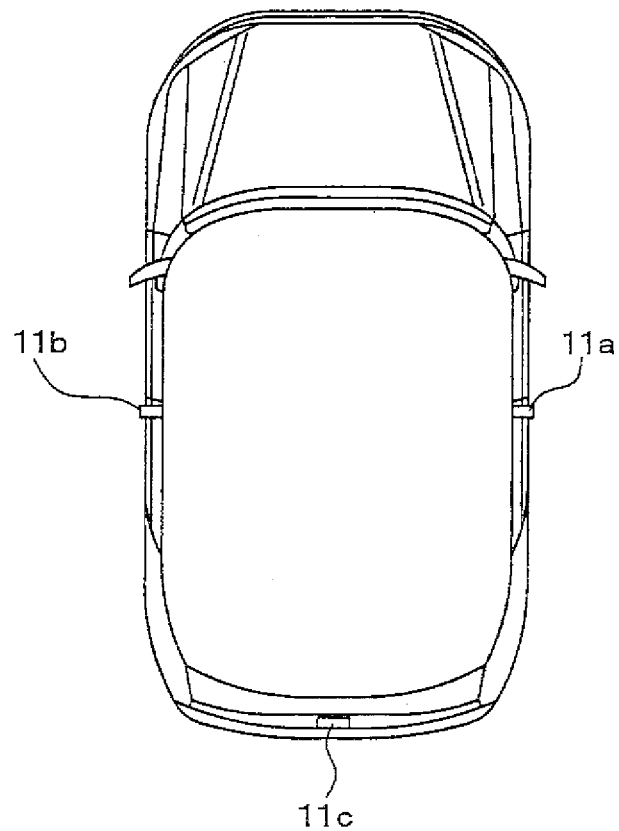
FIG. 2 is a diagram illustrating a D-seat antenna, a P-seat antenna, and an in-trunk antenna.
FIG. 3 is a diagram illustrating transmission frequencies of a D-seat antenna, a P-seat antenna, and an in-trunk antenna.

The D-seat (driver's seat) antenna 11a, the P-seat (front passenger seat) antenna 11b, and the in-trunk antenna 11c are coupled to the LF transmitting unit 11. As illustrated in FIG. 2, the D-seat antenna 11a is arranged inside a center pillar between the front seat and the back seat on a driver's seat side, and the P-seat antenna 11b is arranged inside a center pillar between the front seat and the back seat on a front passenger seat side. The in-trunk antenna 11c is arranged inside the trunk room.

In the present embodiment, the transmission frequencies of the antennae 11a to 11c are adjusted so as to be slightly different from each other. Each of the antennae 11a to 11c in the present embodiment includes a ferrite core antenna having a wide frequency band; accordingly, even when the transmission frequencies of the antennae 11a to 11c are different, the antennae 11a to 11c can have the same output level.

FIG. 3 illustrates the transmission frequency of each of the antennae 11a to 11c. As illustrated in FIG. 3, the transmission frequency of the D-seat antenna 11a is set to 124 kHz, the transmission frequency of the P-seat antenna 11b is set to 144 kHz, and the transmission frequency of the in-trunk antenna 11c is set to 134 kHz. That is, the transmission frequency increases in the order of the D-seat antenna 11a, the in-trunk antenna 11c, and the P-seat antenna 11b.

In the present example, a difference in transmission frequency between the antennae 11a to 11c is set to 10 kHz. Alternatively, the frequency difference may be set in a range from several kHz to several tens of kHz, in consideration of an allowable frequency range or the like of the tuner 12 and a frequency-to-voltage converter circuit 23b. A transmission frequency relation between the D-seat antenna 11a and the P-seat antenna may be reversed with respect to the above example. In this way, the antennae 11a to 11c have different transmission frequencies so that the radio waves transmitted from the antennae 11a to 11c do not interfere with each other. Therefore, even if the radio waves are concurrently transmitted from the antennae 11a to 11c, the radio waves do not interfere with each other, making it possible for the portable apparatus 20 to receive the radio waves from the respective antennae 11a to 11c properly.

Figure 4:
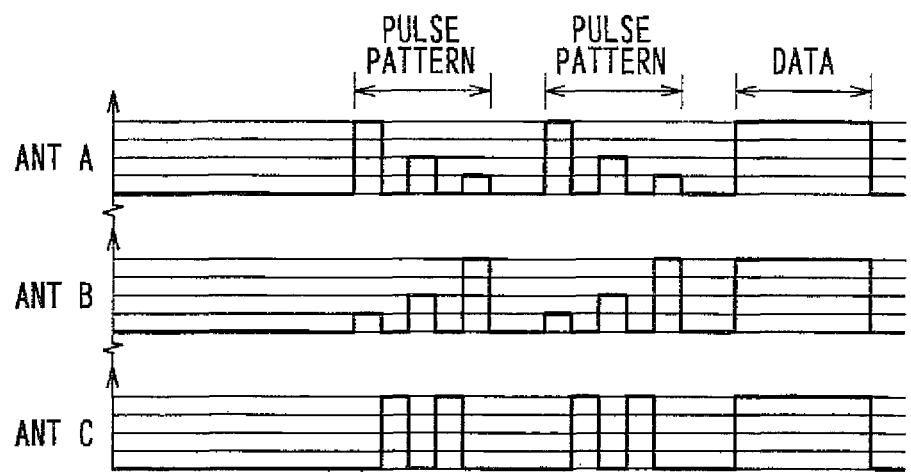
FIG. 4 is an explanatory diagram illustrating signals transmitted from a D-seat antenna, a P-seat antenna, and an in-trunk antenna.

In the keyless entry system of the present embodiment, not only the transmit radio waves radiated from the antennae 118 to 11c have the different frequencies as described above, but also the intensity of the transmit radio wave radiated from each antenna 11a to 11c may be changed according to preset patterns. Specifically, as illustrated in FIG. 4, the D-seat antenna (antenna A) 11a, the P-seat antenna (antenna B) 11b, and the in-trunk antenna (antenna C) 11c repeatedly transmit different specific pulse patterns, and then transmit data including uniquely-assigned identification information etc.

During the pulse pattern period, the antenna A transmits the radio wave with a "high" intensity in a prescribed period and then stops transmitting the radio wave in the prescribed period, transmits the radio wave with a "middle" intensity in the prescribed period and then stops transmitting the radio wave in the prescribed period, and transmits the radio wave with a "low" intensity in the prescribed period and then stops transmitting the radio wave in the prescribed period.

During the pulse pattern period, the antenna B, on the contrary, transmits the radio wave with a "low" intensity in the prescribed period and then stops transmitting the radio wave in the prescribed period, transmits the radio wave with a "middle" intensity in the prescribed period and then stops transmitting the radio wave in the prescribed period, and transmits the radio wave with a "high" intensity in the prescribed period and then stops transmitting the radio wave in the prescribed period.

During the pulse pattern period, the antenna C stops transmitting the radio wave in the prescribed period, transmits the radio wave with a "high" intensity in the prescribed period and then stops transmitting the radio wave in the prescribed period, and again transmits the radio wave with a "high"

intensity in the prescribed period and then stops transmitting the radio wave in the prescribed period.

Figure 5:
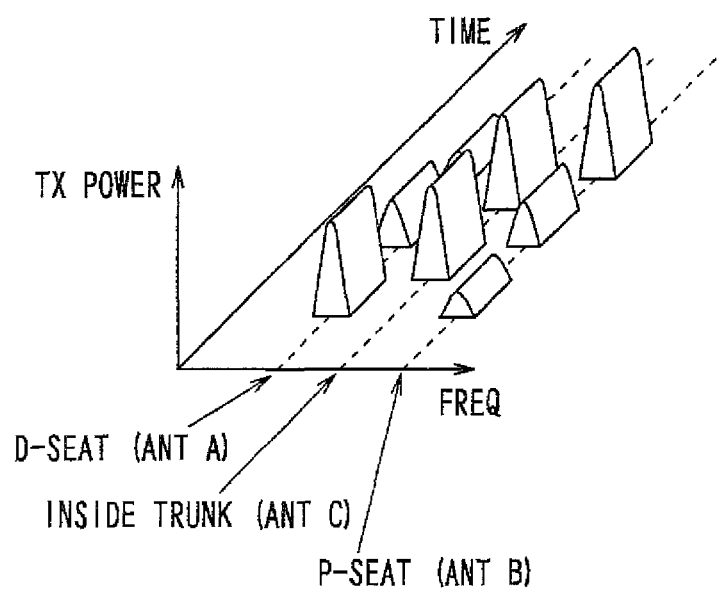
FIG. 5 is a diagram illustrating a relation between a frequency and intensity of a pulse pattern, which is transmitted from a D-seat antenna, a P-seat antenna, and an in-trunk antenna.

The relation of the frequency and the intensity of the pulse pattern transmitted from each of the antennae 11a to 11c can be expressed as illustrated in FIG. 5. As illustrated in FIG. 5, in the keyless entry system of the present embodiment, the radio waves with different frequencies are transmitted from the antennae 11a to 11c, such that the intensity of the radio wave changes according to the pattern set in advance.

Figure 6:
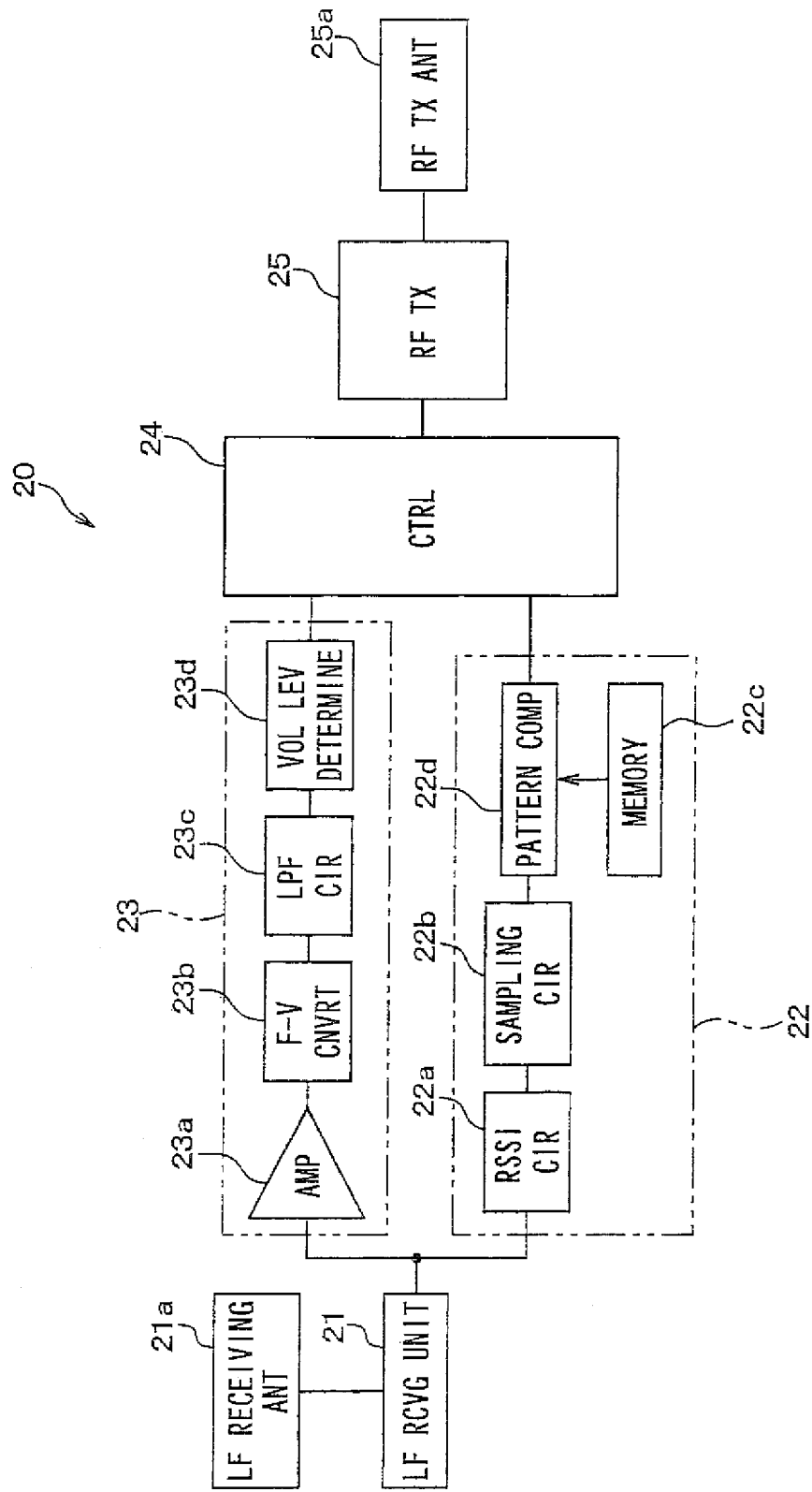
FIG. 6 is a block diagram illustrating a configuration of a portable apparatus of an onboard apparatus control system of the first embodiment.

Next, a configuration of the portable apparatus 20 is explained. FIG. 6 is a block diagram illustrating a configuration of the portable apparatus 20. The portable apparatus 20 includes an LF receiving antenna 21a, an LF receiving unit 21, a pulse pattern determination unit 22, a voltage level determination unit 23, a controller 24, a radio frequency (RF) transmitting unit 25, and an RF transmitting antenna 25a.

The LF receiving antenna 21a receives the radio wave in the LF band transmitted from the in-vehicle apparatus 10. The LF receiving antenna 21a includes a three-axis antenna in two horizontal directions (the X axis and the Y axis) and the vertical direction (the Z axis).

The LF receiving unit 21 performs amplification, demodulation etc. to a three-axis combined received signal, which is inputted from the LF receiving antenna 21a.

The LF receiving antenna 21a and the LF receiving unit 21A receive a combined pattern, which is the received pulse pattern signals transmitted from the antennae A to C. The transmission frequencies of the antennae A to C are different in the present embodiment. Thus, when the pulse pattern signals, whose intensities of the radio waves are changed stepwise according to mutually different patterns, are transmitted from the antennae A to C in overlapping timing, it is possible to receive the combined pattern of the received pulse pattern signals properly.

In cases where the transmission frequencies of the antennae A to C are set to the same, when the pulse pattern signals are transmitted from the antennae A to C at the overlapping timing, it is difficult to receive the combined pattern of the received pulse pattern signals properly because of interference or the like even if the intensities of the radio waves are changed stepwise according to mutually different patterns.

The pulse pattern determination unit 22 includes an RSSI (received signal strength indication) circuit 22a, a sampling circuit 22b, a memory 22c, and a pattern comparing unit 22d.

The RSSI circuit 22a detects a received electric field intensity of a signal received by the LF receiving unit 21. The RSSI circuit 22a outputs an RSSI voltage whose level increases as the received electric field intensity of the signal received by the LF receiving unit 21 increases.

The sampling circuit 22b samples the RSSI voltage outputted by the RSSI circuit 22a at a predetermined sampling frequency, and converts the RSSI signal into a digital signal.

Figure 7:
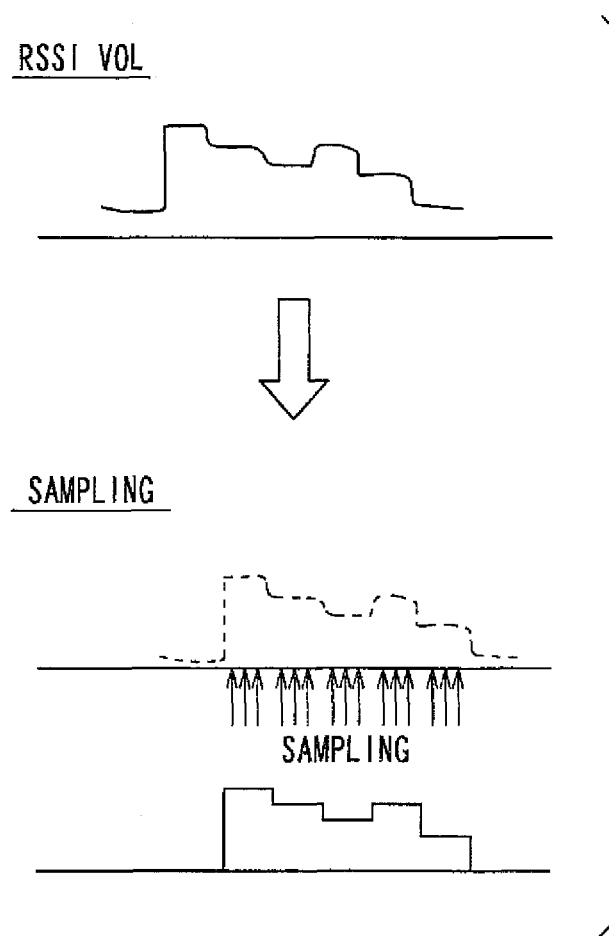
FIG. 7 is an explanatory diagram illustrating sampling of an RSSI voltage.

The RSSI voltage illustrated in the upper row drawing of FIG. 7 is sampled as illustrated in the middle row drawing of FIG. 7 and is converted into the digital signal; and accordingly, a voltage change pattern (envelope pattern) as illustrated in the lower row drawing of FIG. 7 can be extracted by digitization.

The memory 22c stores envelope patterns, which the portable apparatus 20 is to detect at respective locations with respect to the vehicle. The envelope patterns are stored in association with detection locations. In the present embodiment, the envelope patterns stored in the memory 22c are ones obtained by actually changing the position of the portable apparatus 20 with respect to the vehicle.

Figure 8:
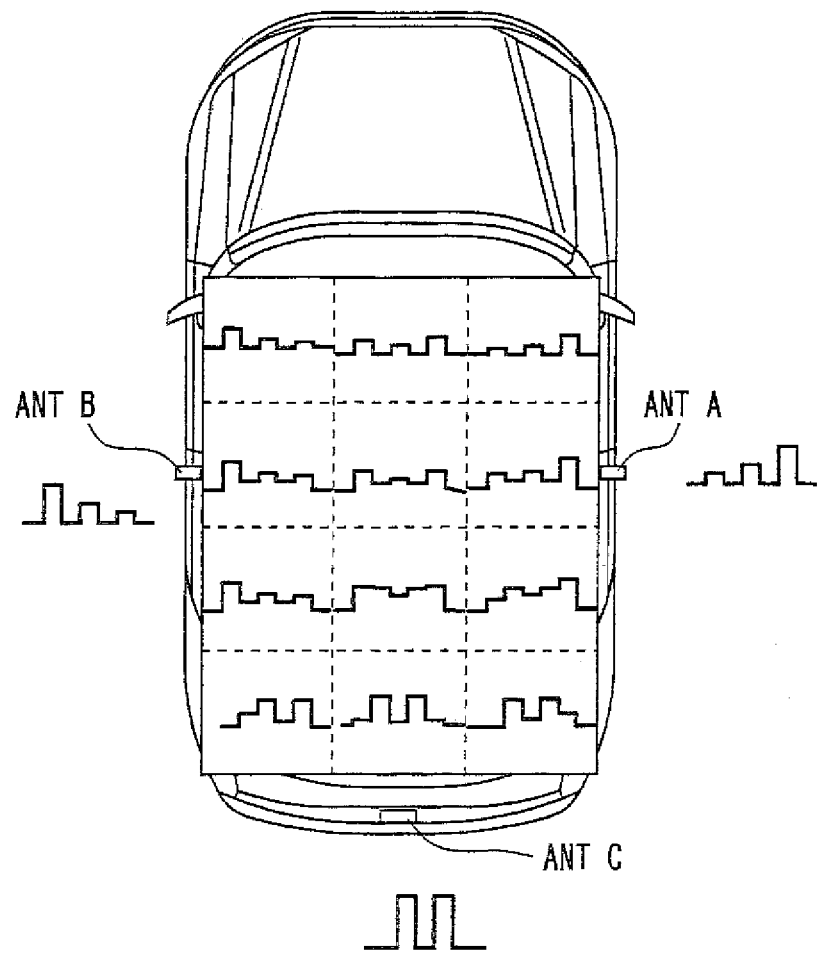
FIG. 8 is a diagram illustrating envelope patterns which a portable apparatus is to detect at respective locations with respect to a vehicle.

FIG. 8 is a conceptual drawing illustrating the envelope patterns which the portable apparatus 20 detects at respective locations with respect to the vehicle. As described above, since the radio waves with different transmission frequencies and different pulse patterns are transmitted from the D-seat (driver's seat) antenna 118, the P-seat (front passenger seat) antenna 11b, and the in-trunk antenna 11c installed to the vehicle, the envelope patterns, each of which is a combination of the radio waves transmitted from the antennae 11a to 11c and is detected by the sampling circuit 22b of the portable apparatus 20, are different according area of the inside of the compartment and the outside of the compartment.

The pattern comparing unit 22d retrieves from the memory 22c an envelope pattern coinciding with the envelope pattern detected by the sampling circuit 22b, and determines the position of the portable apparatus 20. The pattern comparing unit 22d outputs to the controller 24 the information indicating the position of the portable apparatus 20 in terms of multiple-bit digital data.

If there is no envelope pattern coinciding with the envelope pattern detected by the sampling circuit 22b, the pattern comparing unit 22d retrieves a most similar envelope pattern from the memory 22c, determines the position of the portable apparatus 20, and outputs to the controller 24 the information indicating the position of the portable apparatus 20 in terms of multiple-bit digital data.

When the position of the portable apparatus 20 cannot be determined uniquely in the above way, one-bit position-unconfirmed information indicating that the position of the portable apparatus 20 is unconfirmed is outputted to the controller 24.

As illustrated in FIG. 8, in the present embodiment, the pattern comparing unit 22d determines the position of the portable apparatus 20 as one of 15 positions (12 positions inside the compartment plus 3 positions outside the compartment), and the pattern comparing unit 22d outputs to the controller 24 the information indicating the position of the portable apparatus 20 in terms of multiple-bit digital data.

Figure 9:
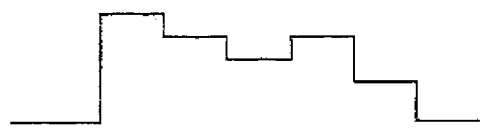
FIG. 9 is a diagram illustrating an example of envelope pattern.

For example, when an envelope pattern as illustrated in FIG. 9 is detected by the sampling circuit 22b, the pattern comparing unit 22d compares this envelope pattern with the envelope patterns stored in the memory 22c, and determines the position of the portable apparatus 20.

Figure 10:
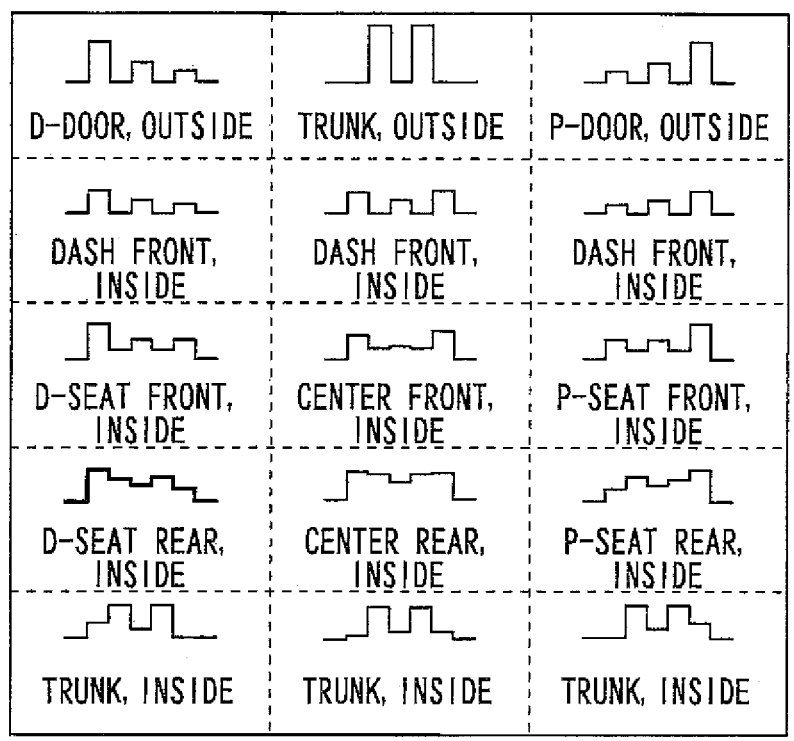
FIG. 10 is a diagram illustrating examples of envelope patterns stored in a memory.

Here, it is assumed that envelope patterns as illustrated in FIG. 10 are stored in the memory 22c. When the envelope pattern illustrated in FIG. 9 coincides with an envelope pattern that is stored in the memory 22c in association with the detection location of "a rear portion of the D-seat side inside the compartment" (described as "D-seat rear, inside" in the figure), the pattern comparing unit 22d determines the position of the portable apparatus 20 as "a rear portion of the D-seat side, inside the compartment", and outputs the information indicating the position of the portable apparatus 20 to the controller 24. In FIG. 10, the notation "D-door, outside" refers to the outside of the compartment in the neighborhood of the D-seat door, and the notation "trunk, outside" refers to the outside of the compartment in the neighborhood of the trunk.

In this way, the portable apparatus position information which indicates the position of the portable apparatus 20 is outputted from the pulse pattern determination unit 22 to the controller 24.

Next, the voltage level determination unit 23 is explained. The voltage level determination unit 23 includes a limiter amplifier 23a, a frequency-to-voltage converter circuit 23b (referred to as an F-V conversion circuit in the figure), an LPF 23c, and a voltage level determination circuit 23d.

The limiter amplifier 23a amplifies and outputs a signal inputted from the LF receiving unit 21.

The frequency-to-voltage converter circuit 23b converts the frequency component included in the input signal into a voltage. The frequency-to-voltage converter circuit 23b of the present embodiment outputs a voltage in proportion to the frequency component included in the input signal.

Figure 11:
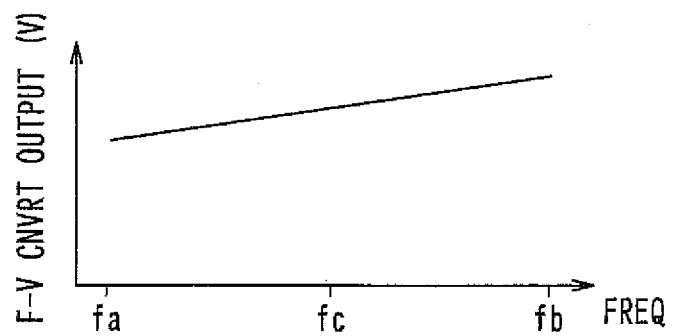
FIG. 11 is a diagram illustrating a relation between an input signal frequency and an output voltage of a frequency-to-voltage converter circuit.

In the frequency-to-voltage converter circuit 23b of the present embodiment, the output voltage becomes higher as the frequency component included in the signal inputted from the LF receiving antenna 21a becomes higher, as illustrated in FIG. 11. In FIG. 11, the transmission frequency fb of the P-seat antenna (antenna B) 11b, the transmission frequency fc of the in-trunk antenna (antenna C) 11c, and the transmission frequency fa of the D-seat antenna (antenna A) 11a are illustrated.

The LPF 23c is a low pass filter which attenuates a signal component of a frequency higher than a certain cut-off frequency, and passes a signal component of a low frequency.

The voltage level determination circuit 23d determines a voltage level of the output voltage of the frequency-to-voltage converter circuit 23b inputted via the LPF 23c, determines the position of the portable apparatus 20 with respect to the vehicle, and outputs the information indicating the position of the portable apparatus 20 (portable apparatus position information) to the controller 24. The voltage level determination circuit 23d includes two comparators (not shown) with different thresholds, determines a voltage level of the output voltage of the frequency-to-voltage converter circuit 23b inputted via the LPF 23c with the use of these comparators, and outputs, to the controller 24, the information indicating the position of the portable apparatus 20 in terms of a multiple-bit logical signal.

Figure 12A:
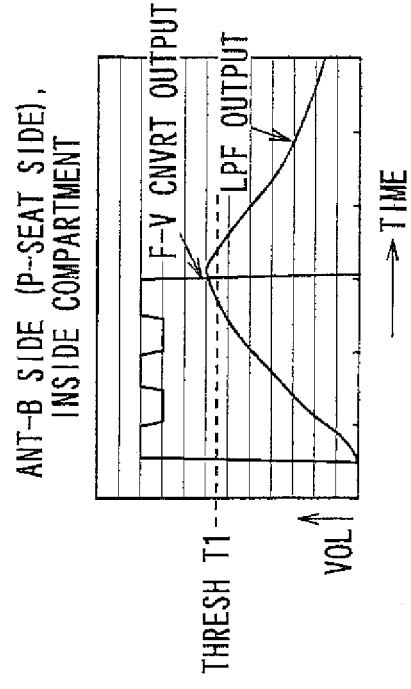
FIGS. 12A to 12C are diagrams illustrating output voltage waveforms of a frequency-to-voltage converter circuit at respective locations with respect to a vehicle.
Figure 12B:
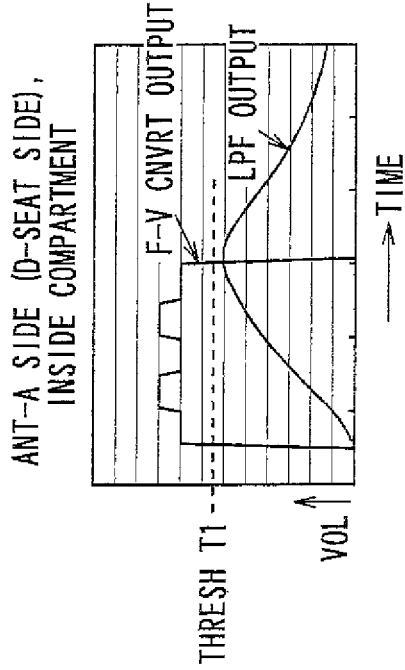
Figure 12C:
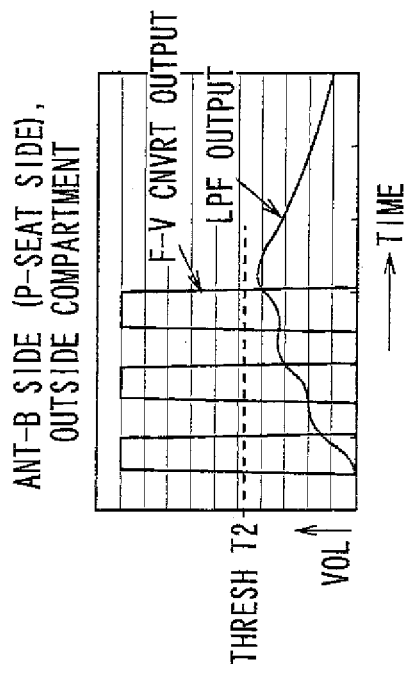

FIGS. 12A to 12C illustrate the relation between the output voltage (F-V conversion output) of the frequency-to-voltage converter circuit 23b and the output voltage (LPF output) of the LPF 23c. FIG. 12A illustrates a case where the portable apparatus 20 is located in an area P1 (inside the compartment on the antenna A side) illustrated in FIG. 13. FIG. 12B illustrates a case where the portable apparatus 20 is located in the area P2 (inside the compartment on the by the side of the antenna B) illustrated in FIG. 13. FIG. 12C illustrates a case where the portable apparatus 20 is located outside the compartment by the side of the antenna B illustrated in FIG. 13. It should be noted that the waveform of the output voltage of the frequency-to-voltage converter circuit 23b illustrated in these figures differs from the one in the case where the pulse pattern signals illustrated in FIG. 4 are received.

When FIG. 12A and FIG. 12B are compared, it is shown that FIG. 12A exhibits a smaller output voltage of the LPF 23c than FIG. 12B. This is because the antenna A has a lower transmission frequency than the antenna B.

Figure 13:
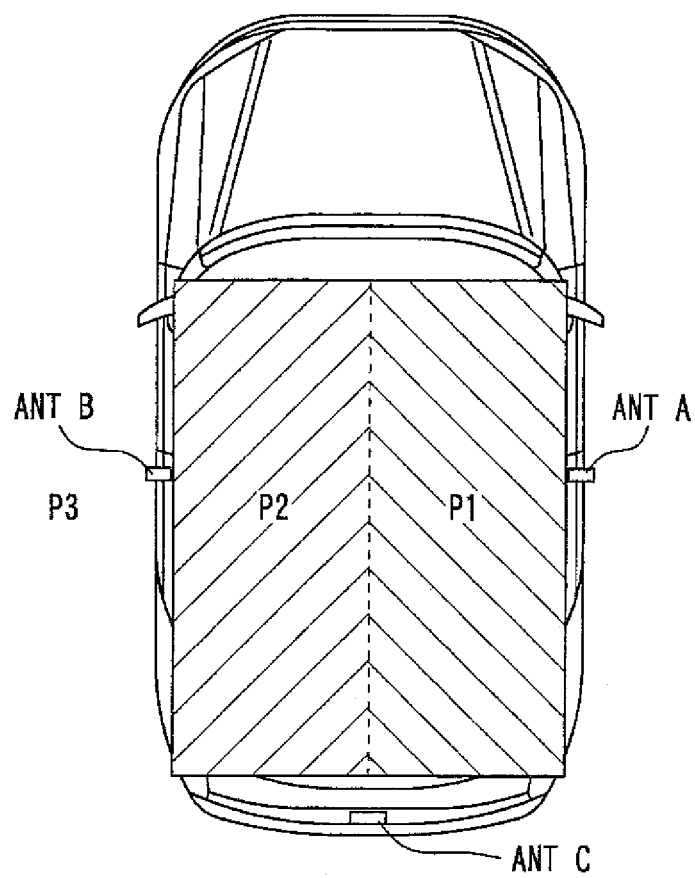
FIG. 13 is an explanatory diagram illustrating area determination of a portable apparatus by an output voltage of a voltage level determination circuit.

When the output voltage of the LPF 23c is greater than or equal to a threshold T1, the voltage level determination circuit 23d determines that the portable apparatus 20 is located in the area P1 (inside the compartment by the side of the antenna A) as illustrated in FIG. 13. When the output voltage of the LPF 23c is less than the threshold T1, the voltage level determination circuit 23d determines that the portable apparatus 20 is located in the area P2 (inside the compartment by the side of the antenna B) illustrated in FIG. 13.

When FIG. 12B and FIG. 12C are compared, it is shown that FIG. 12C exhibits a smaller output voltage of the LPF 23c than FIG. 12B. This is because the radio wave from the antenna 11b (antenna B) becomes dominant outside the compartment such as in the area P3 illustrated in FIG. 13, in contrast to a situation where the radio waves from the antennae 11a to 11c are combined together inside the compartment such as in the area P2 illustrated in FIG. 13.

When the output voltage of the LPF 23c is greater than or equal to a threshold T2, the voltage level determination circuit 23d determines that the portable apparatus 20 is located inside the compartment. When the output voltage of the LPF 23c is less than the threshold T2, the voltage level determination circuit 23d determines that the portable apparatus 20 is located outside the compartment.

Figure 14:
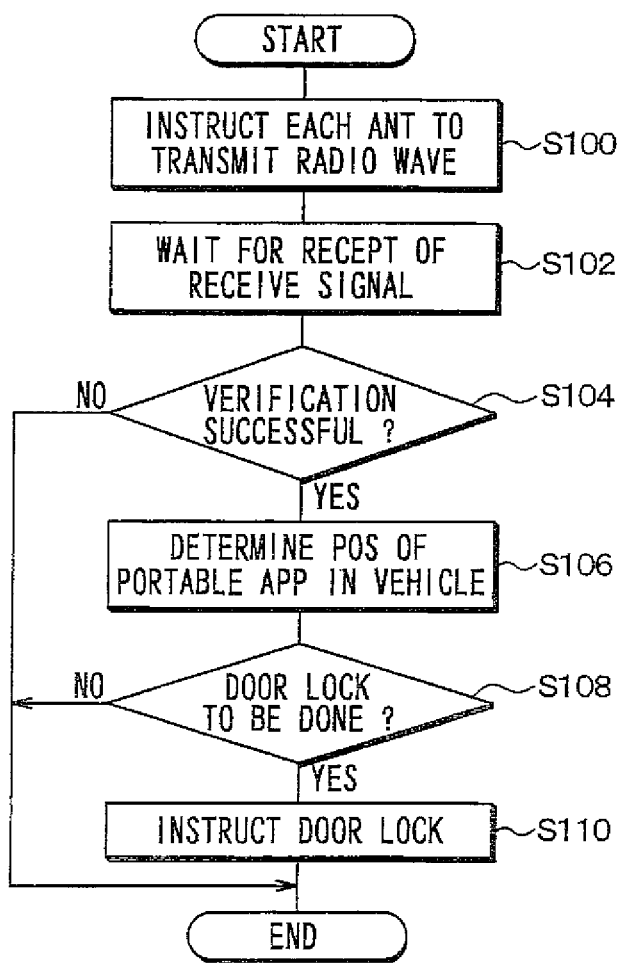
FIG. 14 is a flowchart illustrating a process performed by a controller of an in-vehicle apparatus.

FIG. 14 is a flowchart illustrating a process performed by the controller 13 of the in-vehicle apparatus 10. When the door switch 31 is operated by a user and a signal corresponding to the user operation is inputted from the door switch 31, the controller 13 performs the process illustrated in FIG. 14.

First, the controller 13 instructs the antennae 11a to 11c to transmit the radio waves (S100). Specifically, the controller 13 instructs the LF transmitting unit 11, so that each of the antennae 11a to 11c transmits the pulse pattern signal and the data including the identification information etc. of the portable apparatus 20, as illustrated in FIG. 4. Accordingly, the pulse pattern signals, whose radio wave intensities are changed stepwise according to mutually different patterns, are transmitted at the overlapping timing, as illustrated in FIG. 4. Additionally, the data including the identification information etc. of the portable apparatus 20 is also transmitted.

Next, the controller 13 shifts to a reception waiting state for receipt of a received signal (S102). Upon receiving a signal including the identification information of the portable apparatus 20, the portable apparatus 20 transmits a response signal which includes the identification information of own and the portable apparatus position information indicating the position of the portable apparatus 20 with respect to the vehicle. In the present case, the controller 13 stays in the reception waiting state for receipt of the response signal for the prescribed period. If the response signal has not been received during the prescribed period, the present process is terminated (not shown).

When the response signal has been received during the prescribed period, the controller 13 determines whether the verification is successful or not (S104). Specifically, the controller 13 determines whether the verification is successful or not, based on whether the identification information included in the response signal coincides with the identification information etc. included in the data transmitted at S100.

Here, when the identification information included in the response signal does not coincide with the identification information etc. included in the data transmitted at S100 for some reasons, the controller 13 determines that the verification is unsuccessful. Then the present process is terminated.

When the identification information included in the response signal coincides with the identification information etc. included in the data transmitted at S100, the controller 13 determines that the verification is successful. Next, the controller 13 determines the position of the portable apparatus 20 with respect to the vehicle (S106). Here, the position of the portable apparatus 20 with respect to the vehicle can be determined from the portable apparatus position information included in the response signal.

Next, the controller 13 determines whether door lock is to be performed or not (S108). In the present embodiment, when the position of the portable apparatus 20 is the outside of the compartment, the controller 13 determines that the door lock is to be performed. When the position of the portable apparatus 20 is the inside of the compartment, the controller 13 determines that the door lock is not to be performed.

Here, when the position of the portable apparatus 20 is the outside of the compartment, the determining at S108 results in YES, and the controller 13 instructs the door lock/unlock controller 34 to perform the door lock (S110). In response to the instruction of the door lock, the door lock/unlock controller 34 performs the locking control of the doors of the vehicle, by driving an actuator for performing locking/unlocking of the door of the vehicle, and an actuator for performing locking/unlocking of the trunk door of the vehicle.

When the position of the portable apparatus 20 is the inside of the compartment, the present process is terminated without instructing the door lock/unlock controller 34 to perform the door lock.

Figure 15:
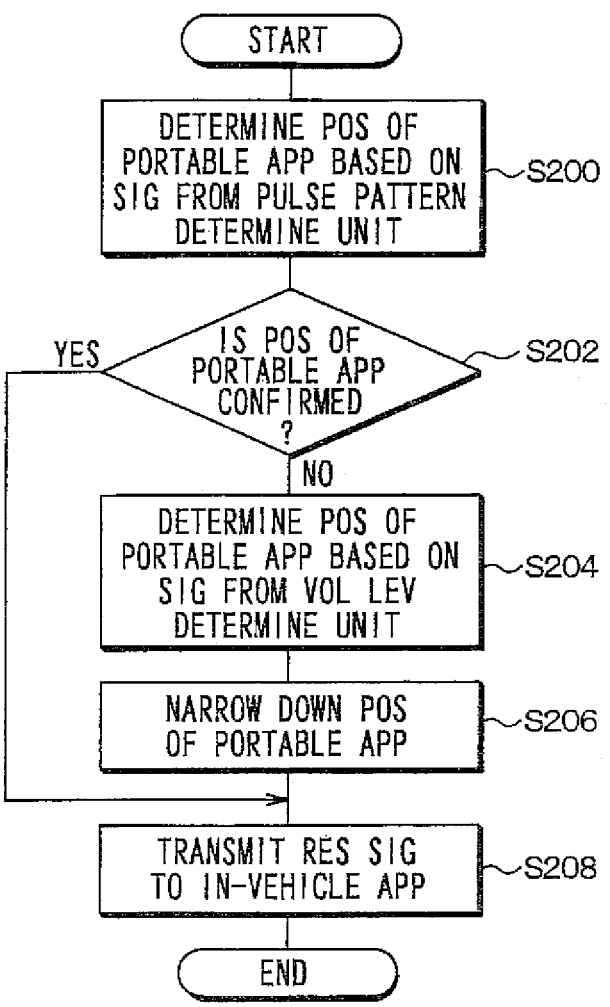
FIG. 15 is a flowchart illustrating a process performed by a controller of the portable apparatus.

FIG. 15 is a flowchart illustrating a process performed by the controller 24 of the portable apparatus 20. When the radio wave of the LF band transmitted from the in-vehicle apparatus 10 is received by the LF receiving antenna 21a and the received signal is inputted from the LF receiving unit 21, the controller 24 performs the process illustrated in FIG. 15.

First, the controller 24 determines the position of the portable apparatus based on the signal from the pulse pattern determination unit 22 (S200). Specifically, the controller 24 determines the position of the portable apparatus 20 based on the information (portable apparatus position information) indicating the position of the portable apparatus 20 inputted from the pulse pattern determination unit 22.

Next, the controller 24 examines whether the position of the portable apparatus 20 is confirmed by the pulse pattern determination unit 22 (S202). Specifically, the controller 24 examines whether the position of the portable apparatus 20 is confirmed based on the "position-unconfirmed information" outputted from the pulse pattern determination unit 22.

Here, when the position of the portable apparatus 20 is confirmed by the pulse pattern determination unit 22, the determination at S202 results in YES. Next, the controller 24 transmits a response signal, which includes the identification information of own and the position of the portable apparatus 20 determined by the pulse pattern determination unit 22, to the in-vehicle apparatus 10 (S208), and terminates the present process.

When the position of the portable apparatus 20 has not been confirmed by the pulse pattern determination unit 22, the determination at S202 results in NO. Next, the controller 24 determines the position of the portable apparatus 20 based on the signal from the voltage level determination unit 23 (S204). Specifically, the controller 24 determines the position of the portable apparatus 20 with respect to the vehicle based on the portable apparatus position information outputted from the voltage level determination unit 23.

Next, the controller 24 narrows down the position of the portable apparatus 20 (S206). The position of the portable apparatus 20 is narrowed down based on the portable apparatus position information outputted from the pulse pattern determination unit 22 and the portable apparatus position information outputted from the voltage level determination unit 23.

For example, in cases where the pulse pattern determination unit 22 has outputted the portable apparatus position information indicating "D-seat rear and inside the compartment" and the "position-unconfirmed information" indicating that the unconformation of the position, and where the voltage level determination unit 23 has outputted the portable apparatus position information indicating "the outside of the compartment", priority is given to the portable apparatus position information indicating "the outside of the compartment" which has been outputted by the voltage level determination unit 23, and thereby, the position of the portable apparatus 20 is determined to be "D-seat rear and outside the compartment."

Next, the controller 24 transmits a response signal including the position of the portable apparatus 20 determined at S206 and the identification information of own to the in-vehicle apparatus 10 (S208), and then, the present process is terminated.

According to the present configuration, the in-vehicle apparatus 10 transmits the pulse pattern signals with the mutually different transmission frequencies at the overlapping timing from the multiple transmitting antennae 11a to 11c arranged at different positions with respect to the vehicle (S100), such that the pulse pattern signals are the radio wave whose intensities are changed stepwise according to the mutually different patterns. A receiving unit (21a, 21) of the portable apparatus 20 receives the pulse pattern signals as the transmitted radio waves from the multiple transmitting antennae. Based on the received pulse pattern signals, the portable apparatus 20 determines the position of the portable apparatus 20 with respect to the vehicle (22, 23) and transmits the portable apparatus position information indicating the position of the portable apparatus 20 to the in-vehicle apparatus 10. Then, the in-vehicle apparatus 10 determines the position of the portable apparatus 20 based on the portable apparatus position information. As can be seen, the sequentially transmitting of the radio waves from the multiple transmitting antennae 11a to 11c by time-shifting is not necessary, and therefore, the accuracy of the position determination of the portable apparatus can improve and the time taken to determine the position of the portable apparatus can be reduced.

The pulse pattern signals, which have the mutually different transmission frequencies and have the radio wave intensities changing stepwise according to the mutually different patterns, are transmitted at the overlapping timing from the multiple transmitting antennae 11a to 11c arranged at different positions in the vehicle. Therefore, the voltage change pattern of the pulse pattern signals received by the receiving unit (21a, 21) of the portable apparatus changes into various patterns depending on the position of the portable apparatus.

According to the above described configuration, the portable apparatus 20 is provided with the storage unit (storage means) 22c which stores the voltage change patterns of the pulse pattern signals, which the receiving unit (21a, 21) is to receive at respective locations with respect to the vehicle. The position of the portable apparatus 20 with respect to the vehicle is determined by comparing the voltage change pattern of the pulse pattern signals received by the receiving unit (21a, 21) with the voltage change patterns stored in the storage unit 22c. Therefore, it is possible to determine the position of the portable apparatus by dividing into relatively-narrow-separated-areas.

The multiple transmitting antennae 11a to 11c are arranged at different positions in the vehicle and are configured to have the transmission frequencies different from each other. The pulse pattern signals, which are radio waves whose intensities vary stepwise according to mutually different patterns, are transmitted from the multiple transmitting antennae 11a to 11c at the overlapping timing. Accordingly, the frequency component included in the pulse pattern signals received by the receiving unit (21a, 21) of the portable apparatus changes depending on the position of the portable apparatus.

As described above, the onboard apparatus control system includes the frequency-to-voltage converter circuit 23b which outputs a voltage corresponding to the frequency of the pulse pattern signals received by the receiving unit (21a, 21), and the low-pass filter 23c which cuts off a high-frequency component and passes a low-frequency component of the voltage outputted from the frequency-to-voltage converter circuit 23b. According to this configuration, it is also possible to determine the position of the portable apparatus with respect to the vehicle according to the voltage level of the output voltage of the low-pass filter.

Also as described above, the onboard apparatus control system includes the pulse pattern determination unit 22 provided with the memory 22c and the pattern comparing unit 22d. The memory 22c stores the voltage change pattern of the pulse pattern signals received by the receiving unit (21a, 21), so that the voltage change pattern depends on location with respect to the vehicle. The pattern comparing unit 22d compares the voltage change pattern of the pulse pattern signals received by the receiving unit (21a, 21) with the voltage change patterns stored in the storage unit 22c to determine the position of the portable apparatus with respect to the vehicle. The onboard apparatus control system further includes the voltage level determination unit 23 provided with the frequency-to-voltage converter circuit 23b, the low-pass filter 23c and the voltage level determination circuit 23d. The frequency-to-voltage converter circuit 23b outputs a voltage corresponding to the frequency of the pulse pattern signals received by the receiving unit (21a, 21). The low-pass filter 23c cuts off a high-frequency component and passes a low-frequency component of the voltage outputted by the frequency-to-voltage converter circuit 23b. The voltage level determination circuit 23d determines the position of the portable apparatus with respect to the vehicle according to the voltage level of the output voltage of the low-pass filter. According to this configuration, it is possible to determine the position of the portable apparatus 20 with greater accuracy, by determining the position of the portable apparatus 20 with respect to the vehicle, based on the position of the portable apparatus 20 determined by the pulse pattern determination unit 22, and the position of the portable apparatus 20 determined by the voltage level determination unit 23.

Second Embodiment

In the first embodiment, the controller 24 of the portable apparatus 20 is configured to determine the position of the portable apparatus 20 with respect to the vehicle. However, in the present embodiment, information for determining the combined pattern signals received by the LF receiving unit 21 is transmitted from the controller 24 of the portable apparatus 20 to the in-vehicle apparatus 10. The controller 13 of the in-vehicle apparatus 10 determines the position of the portable apparatus 20 with respect to the vehicle, based on the information for determining the received combined pattern signal.

Figure 16:
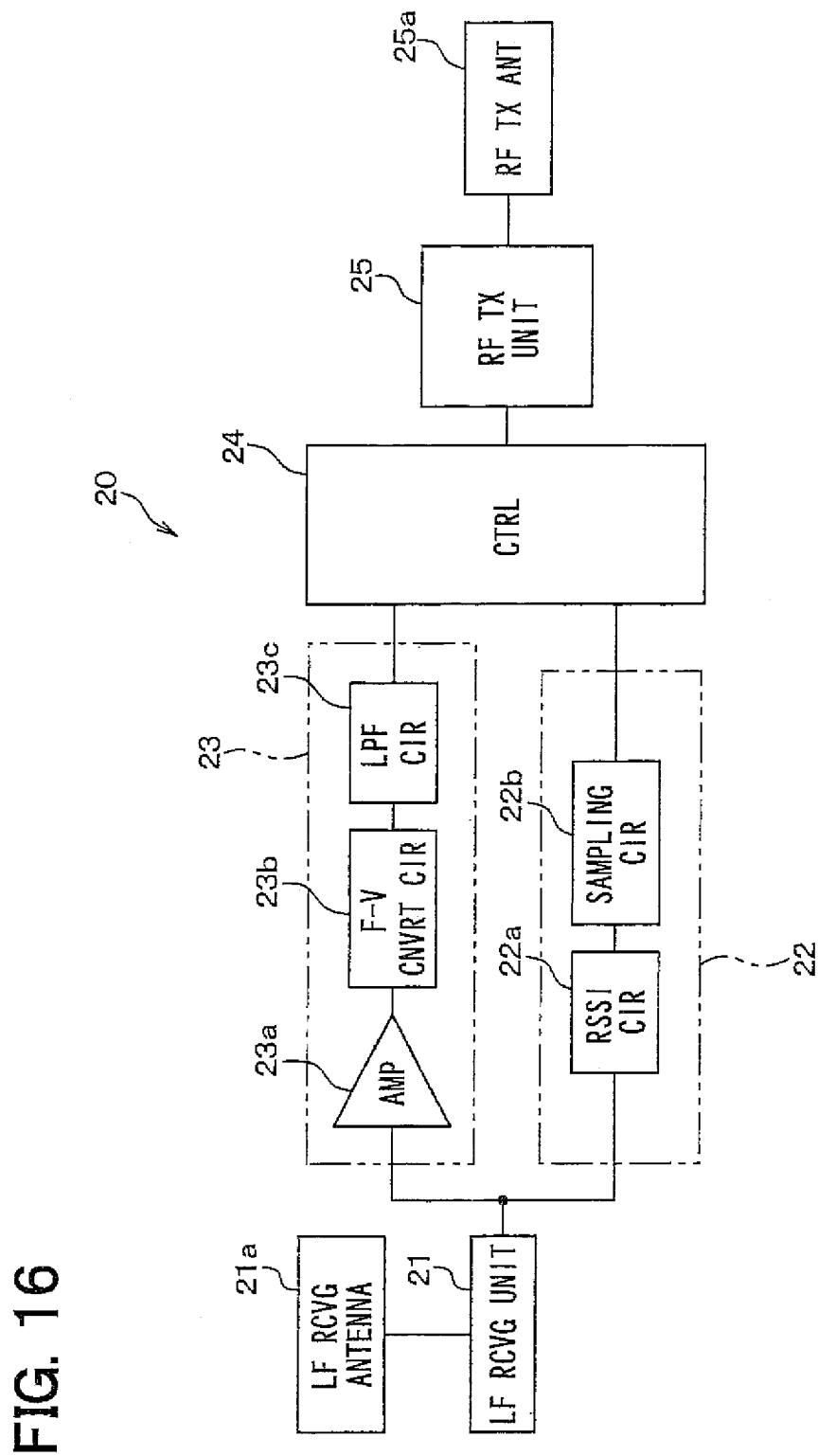
FIG. 16 is a block diagram illustrating a configuration of a portable apparatus of the onboard apparatus control system of a second embodiment.

FIG. 16 illustrates the configuration of the portable apparatus 20 of the onboard apparatus control system of the present embodiment. The portable apparatus 20 of the present embodiment is different from the portable apparatus 20 of the first embodiment in that the pulse pattern determination unit 22 is not provided with the pattern comparing unit 22d and the memory 22c, and that the voltage level determination unit 23 is not provided with the voltage level determination circuit 23d.

The function of the pattern comparing unit 22d and the memory 22c of the pulse pattern determination unit 22 and the function of the voltage level determination circuit 23d of the voltage level determination unit 23 of the portable apparatus 20 of the first embodiment are performed by the controller 13 of the in-vehicle apparatus 10 of the onboard apparatus control system. In this way, in the present embodiment, the in-vehicle apparatus 10 determines the position of the portable apparatus 20 with respect to the vehicle.

Figure 17:
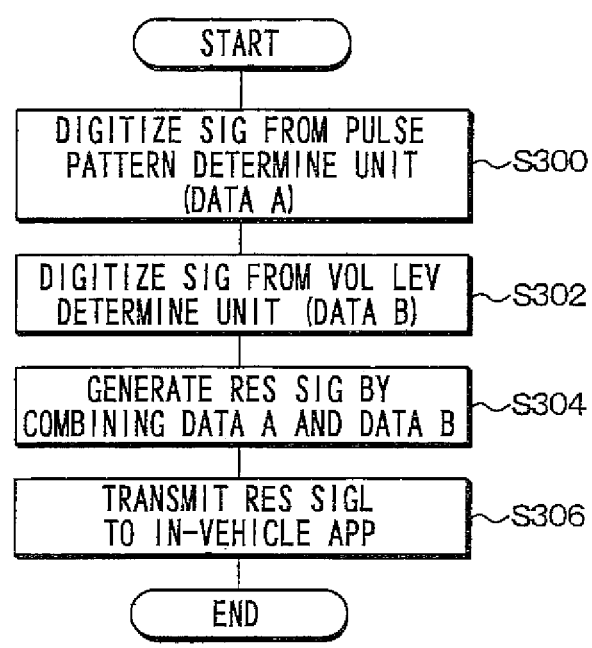
FIG. 17 is a flowchart illustrating a process performed by a controller of a portable apparatus of the onboard apparatus control system of the second embodiment.

FIG. 17 is a flowchart illustrating the process performed by the controller 24 of the portable apparatus 20 of the onboard apparatus control system of the present embodiment. The controller 24 performs the process illustrated in FIG. 17, when a radio wave of the LF band transmitted from the in-vehicle apparatus 10 is received by the LF receiving antenna 21a and the received signal is inputted from the LF receiving unit 21.

First, the controller 24 converts into serial data a voltage change pattern (envelope pattern) inputted from the pulse pattern determination unit 22 (S300). Specifically, the controller 24 digitizes as data A the voltage change pattern of the received combined pattern inputted from the sampling circuit 22b.

Next, the controller 24 converts into serial data a signal inputted from the voltage level determination unit 23 (S302). Specifically, the controller 24 digitizes the output voltage of the LPF circuit 2c as data B. The LPF circuit 23c cuts off the high-frequency component from the voltage obtained by F-V converting the received combined pattern, and outputs the output voltage. In the present embodiment, the data A and the data B correspond to information for determining the received combined pattern.

Next, the controller 24 combines the data A and the data B, thereby generating a response signal (S304). Specifically, the controller 24 generates the response signal by adding various data including the data A and the data B to the identification information of own.

Next, the controller 24 transmits the response signal to the in-vehicle apparatus 10 (S306). Accordingly, the response signal in which the various data including the data A and the data B are added to the identification information of own is transmitted to the in-vehicle apparatus 10.

Figure 18:
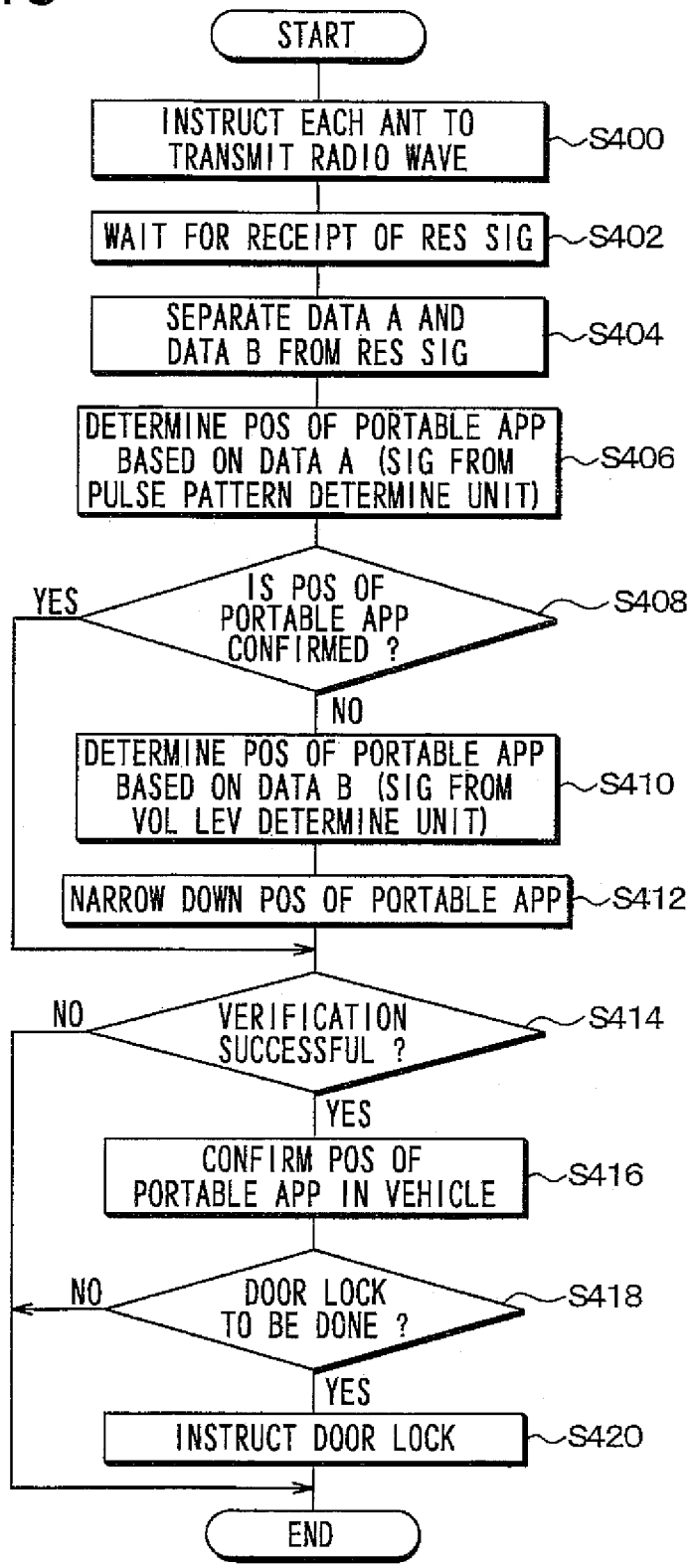
FIG. 18 is a flowchart illustrating a process performed by a controller of the in-vehicle apparatus of the onboard apparatus control system of the second embodiment.

FIG. 18 is a flowchart illustrating the process performed by the controller 13 of the in-vehicle apparatus 10 of the onboard apparatus control system of the present embodiment. When a user operates the door switch 31 and a signal corresponding to the user's operation is inputted from the door switch 31, the controller 13 performs the process illustrated in FIG. 18.

First, the controller 13 instructs the respective antennae 11a to 11c to transmit the radio waves (S400). Specifically, the controller 13 instructs the LF transmitting unit 11 so that the data including such a pulse pattern signal as illustrated in FIG. 4 and the identification information etc. of the portable apparatus 20 is transmitted from each of the antennae 11a to 11c.

Next, the controller 13 shifts to a reception waiting state for receipt of a received signal (S402). Upon receiving a signal including the identification information of own, the portable apparatus 20 transmits a response signal including the identification information of own and the portable apparatus position information indicating the position of the portable apparatus 20 with respect to the vehicle. In the present case, the controller 13 stays in the reception waiting state for receipt of the response signal for a prescribed period. If the response signal has not been received during the prescribed period, the process is terminated (not shown).

When the response signal has been received during the prescribed period, the controller 13 separates the data A and the data B from the response signal (S404). Specifically, the controller 13 extracts the data A and the data B from the response signal and stores them into the RAM 13c.

Next, the controller 13 determines the position of the portable apparatus based on the data A (S406). The ROM 13b of the controller 13 stores envelope patterns, which the portable apparatus 20 is to detect at respective locations with respect to the vehicle. The envelope patterns are stored in association with detection locations. At the present step, the controller 13 determines the received combined pattern based on the data A, retrieves an envelope pattern which coincides with the voltage change pattern of the received combined pattern from the ROM 13b, and determines the position of the portable apparatus 20. When the position of the portable apparatus 20 is determined uniquely in this way, the controller 13 records in the RAM 13c the "position-confirmed information" of one bit which indicates that the position of the portable apparatus 20 is confirmed.

When there is no envelope pattern which coincides with the voltage change pattern of the received combined pattern determined by the data A, the controller 13 retrieves a most similar envelope pattern from the ROM 13b, and determines the position of the portable apparatus 20. When the position of the portable apparatus 20 cannot be determined uniquely in this way, one bit of "position-unconfirmed information" indicating that the position of the portable apparatus 20 is unconfirmed is stored in the RAM 13c.

Next, the controller 13 determines whether the position of the portable apparatus 20 is confirmed or not, based on the "position-confirmed information" and the "position-unconfirmed information" stored in the RAM 13c (S408).

Here, when the position of the portable apparatus 20 is not confirmed, the determination at S408 results in NO. Next, the controller 13 determines the output voltage of the LPF circuit 23c from the data B, and determines the position of the portable apparatus 20 from the determined output voltage of the LPF circuit 23c (S410). Specifically, when the output voltage of the LPF circuit 23c determined from the data B is greater than or equal to the threshold T1, the controller 13 determines that the portable apparatus 20 is located in the area P1 (inside the compartment on an antenna A side) as illustrated in FIG. 13. When the output voltage of the LPF 23c is less than the threshold T1, the controller 13 determines that the portable apparatus 20 is located in the area P2 (inside the compartment on an antenna B side) as illustrated in FIG. 13.

Next, the controller 13 narrows down the position of the portable apparatus 20 (S412). Specifically, the controller 13 narrows down the position of the portable apparatus 20, from the position of the portable apparatus 20 determined using the most similar envelope pattern at S406 and the position of the portable apparatus 20 determined at S410.

For example, in the case where the position of the portable apparatus 20 is determined to be "the D-seat rear and inside the compartment" and the "position-unconfirmed information" indicating that the position is unconfirmed is stored in the RAM 13c at S406, and where the portable apparatus position information indicating "outside the compartment" is outputted at S410, the priority is given to the portable apparatus position information indicating "outside the compartment" determined at S410; and accordingly, the position of the portable apparatus 20 is determined to be "the D-seat rear and outside the compartment."

When it is determined at S408 that the position of the portable apparatus 20 is confirmed, S410 and S412 are skipped and the flow advances to S414.

At S414, the controller 13 determines whether the verification is successful or not (S414). Specifically, the controller 13 determines whether the verification is successful or not, based on whether the identification information included in the response signal coincides with the identification information etc. included in the data transmitted at S400.

Here, when the identification information included in the response signal does not coincide with the identification information etc. included in the data transmitted at S400 for some reasons, it is determined that the verification is unsuccessful and the present process is terminated.

When the identification information included in the response signal coincides with the identification information etc. included in the data transmitted at S400, it is determined that the verification is successful. Next, the controller 13 confirms the position of the portable apparatus 20 with respect to the vehicle (S416). Here, the position of the portable apparatus 20 with respect to the vehicle can be determined from the portable apparatus position information included in the response signal.

Next, the controller 13 determines whether the door lock is to be performed or not (S418). In the present embodiment, when the position of the portable apparatus 20 is the outside of the compartment, the door lock is to be performed, and when the position of the portable apparatus 20 is the inside of the compartment, the door lock is not to be performed.

Here, when the position of the portable apparatus 20 is the outside of the compartment, the determining at S418 results in YES, and the controller 13 instructs the door lock/unlock controller 34 to perform the door lock (S420). In response to the instruction of the door lock, the door lock/unlock controller 34 performs the locking control of the doors of the vehicle, by driving an actuator for performing locking/unlocking of the door of the vehicle, and an actuator for performing locking/unlocking of the trunk door of the vehicle.

When the position of the portable apparatus 20 is the inside of the compartment, the present process is terminated without instructing the door lock/unlock controller 34 to perform the door lock.

As described above, the system can be configured such that the position of the portable apparatus 20 with respect to the vehicle is determined by the in-vehicle apparatus 10.

Embodiments of the present invention are not limited to the above-described embodiments and can have various forms.

For example, the first embodiment and the second embodiment are illustrated with reference to the examples in which the door lock/unlock controller 34 is controlled according to the position of the portable apparatus and the locking control of the door of the vehicle is performed. However, the embodiments are not limited to such examples but are applicable to the locking control of the door of the vehicle, the start control of an engine etc. of the vehicle. Further, the embodiments are applicable to the control other than the locking control and the unlocking control of doors of the vehicle, and the start control of an engine, etc. of the vehicle.

The first embodiment and the second embodiment are illustrated with reference to the examples in which a three-step variable pulse pattern signal as illustrated in FIG. 19A is transmitted. However, it is also possible to adopt, for example, a five-step variable pulse pattern signal as illustrated in FIG. 19B and a seven-step variable pulse pattern signal as illustrated in FIG. 19C.

The first embodiment and the second embodiment are illustrated with reference to the examples in which the radio waves with different frequencies and different pulse patterns are transmitted from the antennae 11a to 11c. However, the number of antennae, the position of antennae, the transmission frequency, and the pulse pattern are not limited to the above examples.

In the first embodiment, the portable apparatus 20 is provided with the pulse pattern determination unit 22 and the voltage level determination unit 23, and determines the position of the portable apparatus 20 by taking into consideration both of the position of the portable apparatus 20 determined by the pulse pattern determination unit 22 and the position of the portable apparatus 20 determined by the voltage level determination unit 23. However, the portable apparatus 20 may not be provided with the pulse pattern determination unit 22, and the voltage level determination unit 23 may determine the position of the portable apparatus 20. Alternatively, the portable apparatus 20 may not be provided with the voltage level determination unit 23, and the pulse pattern determination unit 22 may determine the position of the portable apparatus 20.

In the above-described embodiments, the controller 13, which performs S100, corresponds to an example of a pulse-pattern-signal transmitting means and a pulse-pattern-signal transmitting unit. The controllers 13 and 24, which perform S200, S204, S406, and S410, correspond to an example of a portable apparatus position determining means and a portable apparatus position determining unit. The controller 24, which performs S208, corresponds to an example of a portable apparatus position information transmitting means and a portable apparatus position information transmitting unit. The pattern comparing unit 22d corresponds to an example of a first position determining means and a first position determining unit. The pulse pattern determination unit 22 corresponds to a first portable apparatus position determining means and a first portable apparatus position determining unit. The voltage level determination circuit 23d corresponds to a second position determining means and a second position determining unit. The voltage level determination unit 23 corresponds to a second portable apparatus position determining means and a second portable apparatus position determining unit. The present disclosure has various aspects. For example, according to an aspect, an onboard apparatus control system comprising a portable apparatus portable by a user and an in-vehicle apparatus mounted in a vehicle to control an onboard apparatus according to position of the portable apparatus is provided. The in-vehicle apparatus includes multiple transmitting antennae arranged at mutually-different positions in the vehicle and configured to have mutually-different transmission frequencies and a pulse-pattern-signal transmitting unit configured to transmit pulse pattern signals from the multiple transmitting antennae at an overlapping timing, respectively. The pulse pattern signals are radio waves whose intensities are changed stepwise according to mutually-different patterns, respectively. The portable apparatus includes a receiving unit configured to receive the radio waves transmitted from the multiple transmitting antennae. The onboard apparatus control system further comprises a portable apparatus position determining unit configured to determine the position of the portable apparatus with respect to the vehicle based on a combined pattern of the received pulse pattern signals. Wherein the combined pattern of the pulse pattern signals received by the receiving unit is in accordance with location of the receiving unit with respect to the vehicle.

According to the above configuration, the in-vehicle apparatus includes the multiple transmitting antennae, which are arranged at the different positions in the vehicle and configured to have the mutually different transmission frequencies, and the pulse-pattern-signal transmitting unit, which transmits the pulse pattern signals from the multiple transmitting antennae at the overlapping timing so that the radio wave intensities are changed stepwise according to the mutually different patterns. The portable apparatus includes the receiving unit for receiving the radio waves transmitted from the multiple transmitting antennae, and determines the position of the portable apparatus with respect to the vehicle based on a combined pattern of the pulse pattern signals received by the receiving unit. The combined pattern of the pulse pattern signals depends on the location with respect to the vehicle. Accordingly, in transmitting the radio waves from the multiple transmitting antennae, it is unnecessary to sequentially transmit the radio waves by time shifting. Accuracy in determining the position of the portable apparatus can be improved. A time taken to determine the position of the portable apparatus can be reduced.

The above onboard apparatus control system may further comprise a storage unit for storing a voltage change pattern of the combined pattern of the pulse pattern signals received by the receiving unit according to the location with respect to the vehicle. The portable apparatus position determining unit may determine the position of the portable apparatus with respect to the vehicle by comparing the voltage change pattern of the combined pattern of the pulse pattern signals received by the receiving unit with the voltage change pattern stored in the storage unit.

The pulse pattern signals, whose radio wave intensities are changed stepwise according to the mutually different patterns, are transmitted at the overlapping timing from the multiple transmitting antennae arranged at different positions in the vehicle, so that the pulse pattern signals have mutually different transmission frequencies. Accordingly, the voltage change pattern of the pulse pattern signals received by the receiving unit of the portable apparatus changes into various patterns depending on the position of the portable apparatus.

According to the above-described configuration, the onboard apparatus control system includes the storage unit for storing the voltage change pattern of the combined pattern of the pulse pattern signals to be received by the receiving unit according to the location with respect to the vehicle. The portable apparatus position determining unit compares the voltage change pattern of the combined pattern of the pulse pattern signals received by the receiving unit with the voltage change pattern stored in the storage unit, and determines the position of the portable apparatus with respect to the vehicle. Therefore, it is possible to determine the position of the portable apparatus by dividing an area into relatively-narrow separated areas.

The above onboard apparatus control system may further comprise: a frequency-to-voltage converter circuit for outputting a voltage corresponding to a frequency of the combined pattern of the pulse pattern signals received by the receiving unit; and a low-pass filter for cutting off a high-frequency component of the voltage outputted from the frequency-to-voltage converter circuit and for passing a low-frequency component of the voltage outputted from the frequency-to-voltage converter circuit. The portable apparatus position determining unit determines the position of the portable apparatus with respect to the vehicle according to an output voltage level of the low-pass filter.

The pulse pattern signals, whose radio wave intensities are changed stepwise according to the mutually different patterns, are transmitted at the overlapping timing from the multiple transmitting antennae arranged at different positions in the vehicle, so that the pulse pattern signals have the mutually different transmission frequencies. Therefore, a frequency component included in the pulse pattern signals received by the receiving unit of the portable apparatus is changed depending on the position of the portable apparatus.

Therefore, according to the above configuration, the portable apparatus position determining unit can also determine the position of the portable apparatus with respect to the vehicle according to the output voltage level of the low-pass filter because the frequency-to-voltage converter circuit outputs the voltage corresponding to the frequency of the combined pattern of the pulse pattern signals received by the receiving unit, and the low-pass filter cuts off the high-frequency component and passes the low-frequency component of the voltage outputted from the frequency-to-voltage converter circuit, Alternatively, the above onboard apparatus control system may further comprise: a storage unit for storing a voltage change pattern of the combined pattern of the pulse pattern signals received by the receiving unit according to the location with respect to the vehicle; a frequency-to-voltage converter circuit for outputting a voltage corresponding to a frequency of the combined pattern of the pulse pattern signals received by the receiving unit; and a low-pass filter for cutting off a high-frequency component of the voltage outputted from the frequency-to-voltage converter circuit and for passing a low-frequency component of the voltage outputted from the frequency-to-voltage converter circuit. The portable apparatus position determining unit determines the position of the portable apparatus with respect to the vehicle, based on the position of the portable apparatus obtained by comparing the voltage change pattern of the combined pattern of the pulse pattern signals received by the receiving unit with the voltage change pattern stored in the storage unit, and the position of the portable apparatus obtained according to the voltage level of the output voltage of the low-pass filter.

According to the above configuration, the position of the portable apparatus with respect to the vehicle is determined based on the position of the portable apparatus obtained by comparing the voltage change pattern of the combined pattern of the pulse pattern signals received by the receiving unit with the voltage change pattern stored in the storage unit, and the position of the portable apparatus obtained according to the output voltage level of the low-pass filter. Accordingly, it is possible to determine the position of the portable apparatus with high accuracy.

In the onboard apparatus control system, the portable apparatus position determining unit may be included in the portable apparatus.

Moreover, the portable apparatus may further include a portable apparatus position information transmitting unit configured to transmits, to the in-vehicle apparatus, portable apparatus position information indicative of the position of the portable apparatus determined by the portable apparatus position determining unit. Upon receiving the portable apparatus position information, the in-vehicle apparatus may control the onboard apparatus according to the position of the portable apparatus determined based on the portable apparatus position information.

Alternatively, the above onboard apparatus control system may be configured as follows. The portable apparatus position determining unit is included in the in-vehicle apparatus. The in-vehicle apparatus controls the onboard apparatus according to the position of the portable apparatus determined by the portable apparatus position determining unit.

Embodiment, configuration, aspects etc. of the present disclosure are not limited to above-described respective embodiments, configurations and aspects etc. Embodiments, configurations, aspects etc. obtained by combining technical parts disclosed in the different embodiments, configurations, aspects etc. are also included in scope of the embodiment, the configuration, and the aspect etc. of according to the present disclosure.

What is claimed is:

1. An onboard apparatus control system, comprising:
 a portable apparatus portable by a user; and
 an in-vehicle apparatus mounted in a vehicle to control an onboard apparatus according to position of the portable apparatus,
 the in-vehicle apparatus including
  a plurality of transmitting antennae arranged at mutually-different positions in the vehicle and configured to have mutually-different transmission frequencies and
  a pulse-pattern-signal transmitting unit configured to transmit pulse pattern signals from the plurality of transmitting antennae at an overlapping timing, respectively, wherein the pulse pattern signals are radio waves whose intensities are changed stepwise according to mutually-different patterns, respectively,
 the portable apparatus including
  a receiving unit configured to receive the radio waves transmitted from the plurality of transmitting antennae,
 the onboard apparatus control system further comprising
  a portable apparatus position determining unit configured to determine the position of the portable apparatus with respect to the vehicle based on a combined pattern of the received pulse pattern signals, wherein the combined pattern of the pulse pattern signals received by the receiving unit is in accordance with location of the receiving unit with respect to the vehicle.

2. The onboard apparatus control system according to claim 1, further comprising:
 a storage unit for storing a voltage change pattern of the combined pattern of the pulse pattern signals received by the receiving unit according to the location with respect to the vehicle,
 wherein:
 the portable apparatus position determining unit determines the position of the portable apparatus with respect to the vehicle by comparing the voltage change pattern of the combined pattern of the pulse pattern signals received by the receiving unit with the voltage change pattern stored in the storage unit.

3. The onboard apparatus control system according to claim 1, further comprising:
 a frequency-to-voltage converter circuit for outputting a voltage corresponding to a frequency of the combined pattern of the pulse pattern signals received by the receiving unit; and
 a low-pass filter for cutting off a high-frequency component of the voltage outputted from the frequency-to-voltage converter circuit and for passing a low-frequency component of the voltage outputted from the frequency-to-voltage converter circuit,
 wherein:
 the portable apparatus position determining unit determines the position of the portable apparatus with respect to the vehicle according to a output voltage level of the low-pass filter.

4. The onboard apparatus control system according to claim 1, further comprising:
 a storage unit for storing a voltage change pattern of the combined pattern of the received pulse pattern signals which the receiving unit is to receive at each location with respect to the vehicle;
 a frequency-to-voltage converter circuit for outputting a voltage corresponding to a frequency of the combined pattern of the pulse pattern signals received by the receiving unit; and a low-pass filter for cutting off a high-frequency component of the voltage outputted from the frequency-to-voltage converter circuit and for passing a low-frequency component of the voltage outputted from the frequency-to-voltage converter circuit, wherein:

the portable apparatus position determining unit determines the position of the portable apparatus with respect to the vehicle, based on the position of the portable apparatus obtained by comparing the voltage change pattern of the combined pattern of the pulse pattern signals received by the receiving unit with the voltage change pattern stored in the storage unit, and the position of the portable apparatus obtained according to the voltage level of the output voltage of the low-pass filter.

5. The onboard apparatus control system according to claim 1, wherein:

the portable apparatus position determining unit is included in the portable apparatus.

6. The onboard apparatus control system according to claim 5, wherein:

the portable apparatus further includes a portable apparatus position information transmitting unit configured to transmit, to the in-vehicle apparatus, portable apparatus position information indicative of the position of the portable apparatus determined by the portable apparatus position determining unit; and upon receiving the portable apparatus position information, the in-vehicle apparatus controls the onboard apparatus according to the position of the portable apparatus determined based on the portable apparatus position information.

7. The onboard apparatus control system according to claim 1, wherein:

the portable apparatus position determining unit is included in the in-vehicle apparatus; and the in-vehicle apparatus controls the onboard apparatus according to the position of the portable apparatus determined by the portable apparatus position determining unit.

\* \* \* \* \*